No. 735,268. Patented August 4, 1903.

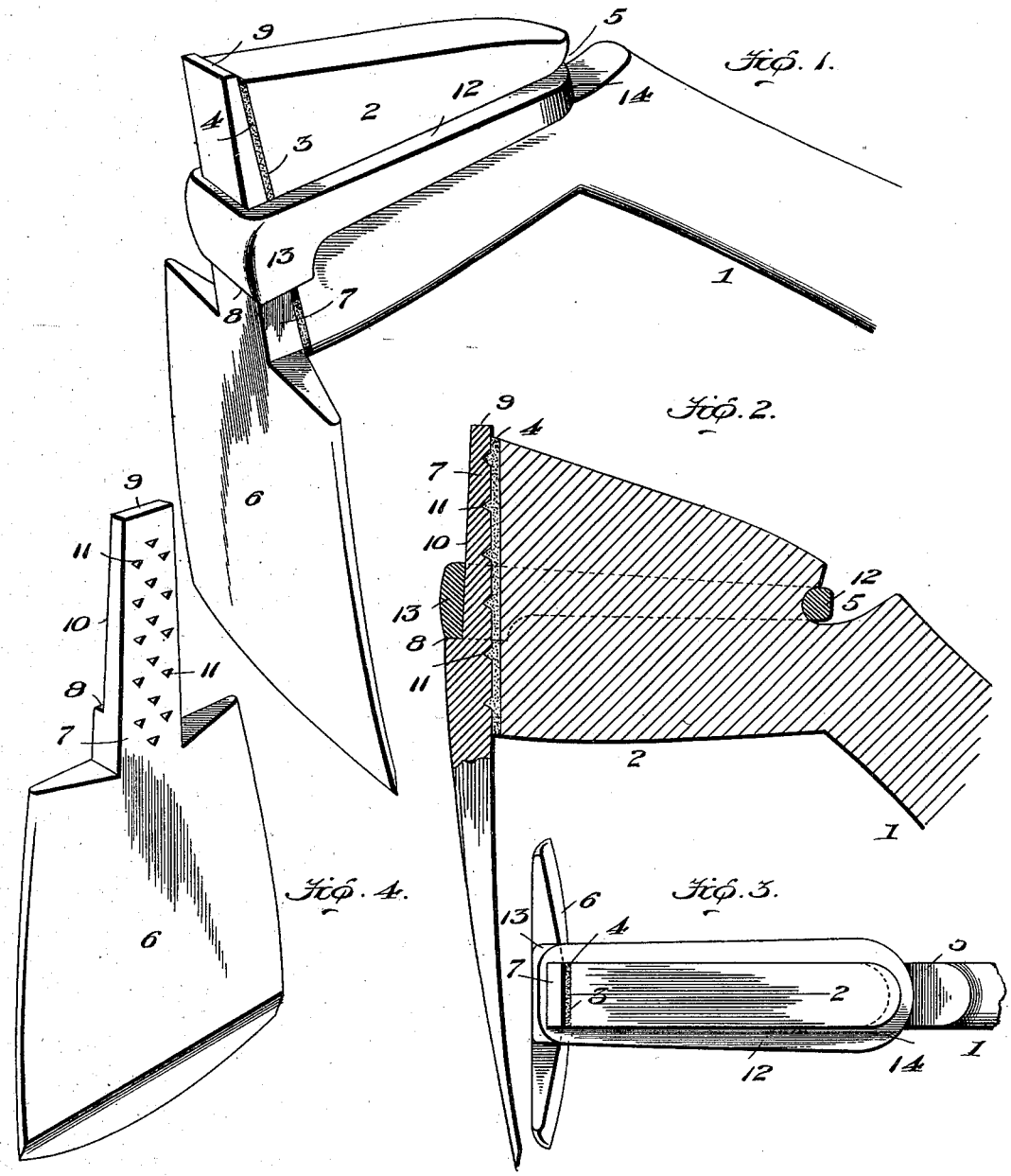

UNITED STATES PATENT OFFICE.

OSCAR KEEHME, OF BISBEE, ARIZONA TERRITORY.

SINGLE-HAND ADZ.

SPECIFICATION forming part of Letters Patent No. 735,268, dated August 4, 1903.

Application filed December 2, 1902. Serial No. 133,580. (No model.)

*To all whom it may concern:*

Be it known that I, OSCAR KEEHME, a citizen of the United States, residing at Bisbee, county of Cochise, and Territory of Arizona, have invented certain new and useful Improvements in Single-Hand Adzes, of which the following is a specification.

My invention relates to adzes, and has for its object the provision of an adz of improved and novel construction wherein the blade is removably secured to the handle by a novel connection, permitting ready removal of the blade for purposes of sharpening and securing the blade firmly at all times.

My object is to provide an adz wherein the fastening connection for securing the blade to the handle will be of such novel construction that continued use tends to more securely fasten the blade to the handle, and I also have for an object the provision of an adz which will be of simple, strong, and durable construction and relatively cheap.

To accomplish the foregoing objects, I provide an adz of the improved and novel construction set forth in detail hereinafter and recited in the appended claims.

In the accompanying drawings, Figure 1 is a perspective; Fig. 2, a section; Fig. 3, a plan; Fig. 4, a detail of the blade, showing the shoulder and the indentations upon the shank.

The numeral 1 designates the handle, having the head 2, which is provided with the flat face 3, to which is secured in any suitable manner a facing-strip 4, preferably of leather. The head also has a somewhat undercut notch 5. The blade is shown at 6 and has a shank 7, provided with a shoulder 8. From the shoulder to the extremity 9 of the shank the shank has a tapered or beveled face 10. The shank is of substantially the same width as the thickness of the head of the handle and is provided on its face adjacent thereto with the indentations 11, into which the leather facing 4 takes on account of the pressure of the connection holding the shank, so that slipping of the shank is prevented. A yoke 12 is employed for securing the shank to the head of the handle, said yoke being in the form of a link and having the downwardly-enlarged head 13, where it encompasses the shank to give a broader bearing on the shank, and said head is abutted by the shoulder 8. The other end of the yoke is rounded at 14 and received in the undercut notch 5.

On account of the bevel 10 continued use of the adz serves to wedge the shank in more tightly between the head 13 and the facing-strip 4, and hence the connection becomes stronger from continued use. The yoke abuts both faces of the head 2, and thus any lateral shifting of the yoke or the shank is prevented.

To remove the blade, it is only necessary to strike the end 9 of the shank against some solid object, which loosens the shank from the grip of the head 13.

Having thus described my invention, what I claim as new, and desire to secure by Letters Patent, is—

1. In a tool or implement, the combination with a handle having a notch, of a tool or implement having a shank, and a yoke disposed substantially at right angles to the free or operative portion of the tool having a portion engaged in the notch of the handle and another portion embracing the shank of the tool or implement and engaged therewith.

2. In a tool or implement, the combination with a handle having a notch, of a tool or implement having a shank provided with a beveled or tapered portion, and a yoke in the form of a link disposed substantially at right angles to the free or operative portion of the tool which is received in the notch of the handle and embraces the shank of the tool or implement and bears against the beveled or tapered portion thereof.

3. In a tool or implement, the combination with a handle, of a tool or implement having a shank provided with a shoulder, said shank resting against the handle, and a connection having a portion anchored to the handle and another portion engaged with the shank and abutting the shoulder.

4. In a tool or implement, the combination with a handle having a notch, of a tool or implement having a beveled shank provided with a shoulder and resting against the handle, and a yoke in the form of a link which embraces the handle and has one portion received in the notch and the other portion embracing the shank and bearing against the beveled portion and the shoulder.

5. In a tool or implement, the combination with a handle, of a compressible facing on the handle, a tool or implement having a shank provided with depressions where it rests against the facing, said depressions receiving portions of the compressible facing, and a yoke embracing the handle and shank of the tool and connecting them together, and disposed substantially at right angles to the operative portion of the tool.

6. In a tool or implement, the combination with a handle having a head disposed at an angle to the handle portion thereof, of a tool or implement having its shank resting against the face of the angularly-disposed head, and a connection between the said head-abutting shank and the head, said tool or implement in its general extent throughout extending at an angle to the handle and the connection being disposed substantially at right angles to the free or operative portion of the tool.

7. In a tool or implement, the combination with a handle having a head disposed at an angle to the handle and provided with a notch, of a tool or implement having its shank resting against the face of the angularly-disposed head, and a link or yoke embracing the head and arranged substantially at right angles to the free or operative portion of the tool and having one portion received in the notch and another portion around the shank of the tool or implement whereby looseness of the shank is prevented.

In testimony whereof I hereunto affix my signature in presence of two witnesses.

OSCAR KEEHME.

Witnesses:
   BRET H. THOMAS,
   LOUIS I. DREEBEN.